United States Patent
Mohammed et al.

(10) Patent No.: US 11,516,810 B1
(45) Date of Patent: Nov. 29, 2022

(54) SMART MECHANISM FOR BAND SELECTION IN 5G NR

(71) Applicant: Apple Inc., Cupertino, CA (US)

(72) Inventors: Sofheem Mohammed, Cupertino, CA (US); Harshal R. Mane, Cupertino, CA (US); Rohit Thareja, Cupertino, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 17/331,163

(22) Filed: May 26, 2021

(51) Int. Cl.
*H04W 72/04* (2009.01)
*H04W 72/02* (2009.01)
*H04L 5/00* (2006.01)
*H04W 72/08* (2009.01)

(52) U.S. Cl.
CPC .......... *H04W 72/048* (2013.01); *H04L 5/0032* (2013.01); *H04W 72/02* (2013.01); *H04W 72/044* (2013.01); *H04W 72/085* (2013.01)

(58) Field of Classification Search
CPC .................................................. H04W 72/048
See application file for complete search history.

(56) References Cited

U.S. PATENT DOCUMENTS

| | | | |
|---|---|---|---|
| 2019/0253867 A1 | 8/2019 | Abedini et al. | |
| 2021/0044993 A1* | 2/2021 | Jha | H04W 36/0083 |
| 2021/0076270 A1* | 3/2021 | Sreenivasa | H04W 36/0085 |
| 2022/0124544 A1* | 4/2022 | Jha | H04L 5/0091 |

FOREIGN PATENT DOCUMENTS

| | | | |
|---|---|---|---|
| EP | 3634043 A1 | 4/2020 | |
| WO | 2020076224 A1 | 4/2020 | |

* cited by examiner

*Primary Examiner* — Edan Orgad
*Assistant Examiner* — Won Tae C Kim
(74) *Attorney, Agent, or Firm* — Kowert, Hood, Munyon, Rankin & Goetzel, P.C.

(57) ABSTRACT

This disclosure relates to methods and devices for a user equipment device (UE) to perform band measurements and provide a pruned measurement report to a base station. A first connection is established between the UE and a base station, and a configuration message is received from the base station. The configuration message identifies a plurality of bands for which the UE is to provide measurement reporting. The UE determines whether a band combination of the plurality of bands has an aggregate bandwidth that is greater than the aggregate bandwidth of the first connection and whether a signal quality metric of the determined band combination is greater than a predetermined threshold. Responsive to these determinations, the UE performs band measurements on the bands of the band combination and transmits a pruned measurement report to the base station.

20 Claims, 7 Drawing Sheets

SMART MECHANISM FOR BAND SELECTION IN 5G NR

TECHNICAL FIELD

The present application relates to wireless communication, including methods, systems, and apparatuses to provide measurements reports for band selection by a wireless device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. For example, the design of wireless networks may increasingly include carrier aggregation (CA). During a CA communication session, a wireless device may be in communication with each of a primary cell (PCell) and one or more secondary cells (SCells). The introduction of multiple active cells, and in particular cells that operate at higher frequency such as millimeter wave (mmW) cells, may increase the risk of overheating for the wireless device. Therefore, improvements in the field are desired.

SUMMARY

Embodiments are presented herein of, inter alia, systems, apparatuses, and methods for a user equipment device (UE) to perform band measurements and provide a pruned measurement report to a base station.

In some embodiments, a first connection is established between the UE and one or more base stations. The connection may be an LTE connection with an eNB, a standalone (SA) connection with a gNB, or a non-standalone (NSA) connection with both an eNB and a gNB.

In some embodiments, a configuration message is received from the base station. The configuration message may include a respective band identifier (ID) for each of a plurality of bands for which the UE is to provide measurement reporting. The configuration message may include a measurement object that specifies the band IDs for each of the plurality of bands.

In some embodiments, the UE determines whether a band combination of the plurality of bands has a first aggregate bandwidth that is greater than a second aggregate bandwidth of the first connection. In some embodiments, the UE further determines whether a signal quality metric of the determined band combination is greater than a predetermined threshold. In various embodiments, the signal quality metric includes a received signal to received power (RSRP) ratio and/or a signal-to-noise ratio (SNR), and each of the RSRP ratio and the SNR may have their own respective quality thresholds.

In some embodiments, when it is determined that a band combination has an aggregate bandwidth greater than that of the current connection and it is further determined that the signal quality metric of the band combination is greater than the signal quality threshold(s), the UE performs band measurements on the bands of the band combination and transmits a pruned measurement report to the base station. The pruned measurement report includes a measurement report on the bands of the band combination.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
UMTS: Universal Mobile Telecommunications System
UTRAN: UMTS Terrestrial Radio Access Network or Universal Terrestrial Radio Access Network
UE: User Equipment
LTE: Long Term Evolution
NR: New Radio
E-UTRAN: Evolved UMTS Radio Access Network or Evolved Universal Radio Access Network
RRC: Radio Resource Control
RLC: Radio Link Control
MAC: Media Access Control
PDCP: Packet Data Convergence Protocol
RF: radio frequency
DL: downlink
UL: uplink
NW: Network
BS: base station
MME: Mobility Management Entity
AMF: Access Management Function
AS: access stratum
NAS: non-access stratum
RAT: radio access technology
PLMN: public land mobile network
LAA: licensed assisted access
CA: carrier aggregation
Rx: receiver
PDCCH: physical downlink control channel
PDSCH: physical downlink shared channel
PRB: physical resource block
DCI: downlink control information
SNR: signal-noise ratio
RSRP: reference signal received power
SF: subframe

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
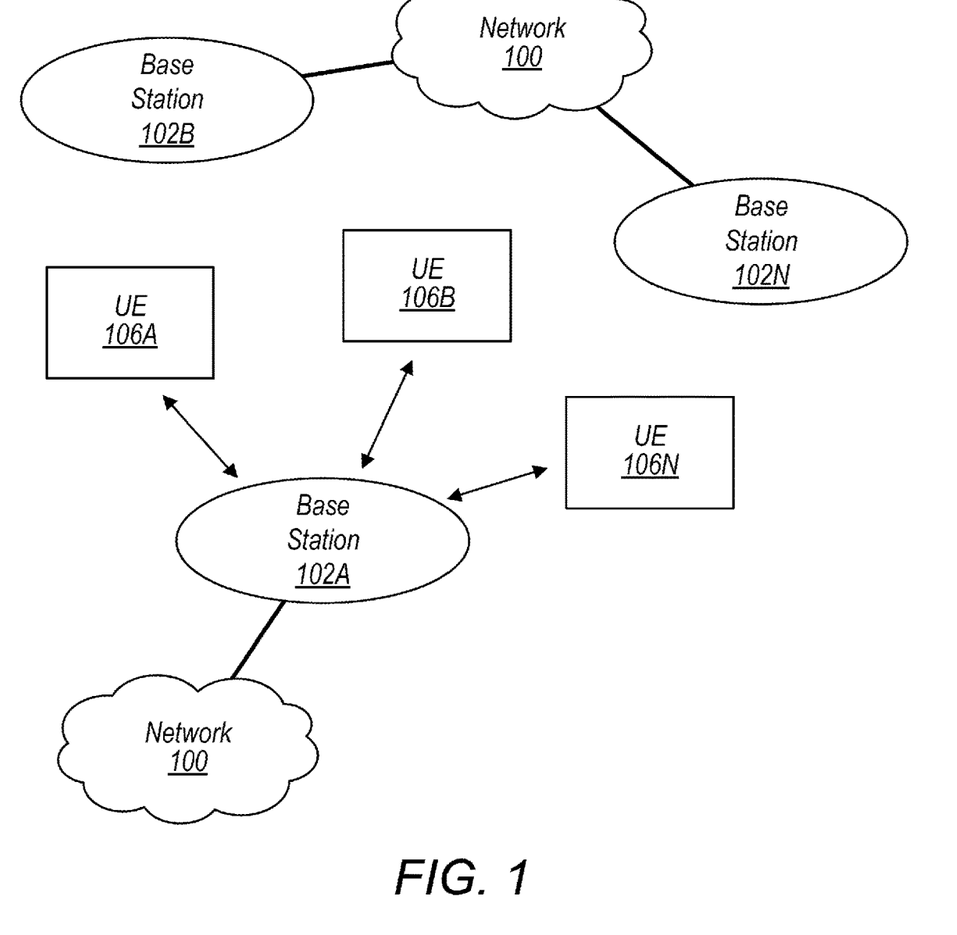
FIG. 1 illustrates an exemplary (and simplified) wireless communication system, according to some embodiments.
Figure 2:
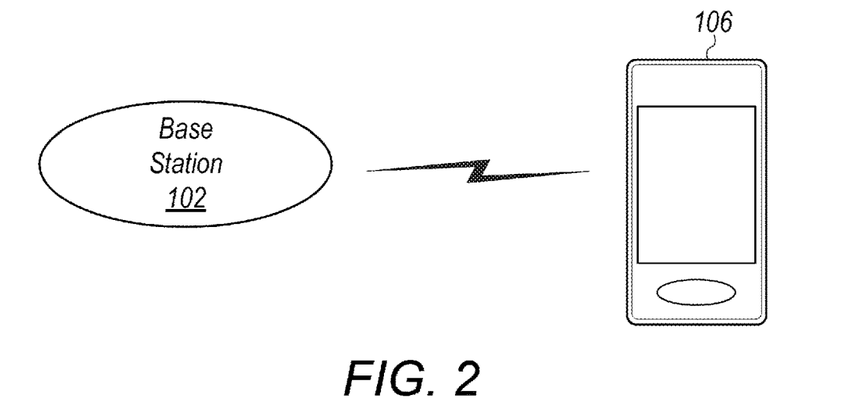
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for performing signal detection as described herein, e.g., according to one or more of the methods described herein. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 5G NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, 5G NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, UMTS, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple input multiple output (MIMO) communications) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

The UE 106 and/or BS 102 may be configured to perform carrier aggregation (CA). For example, the BS 102 may use carriers using any combination of RATs to communicate with UE 106. As one possibility, the UE 106 and BS 102 may employ licensed assisted access (LAA) techniques, and may thus aggregate licensed and unlicensed spectrum for communication. Carrier aggregation may employ a primary cell (PCell) and one or more secondary cells (SCells), which may be collocated within a single base station tower, or may be distributed over a first BS and one or more neighboring BSs, according to various embodiments.

Figure 3:
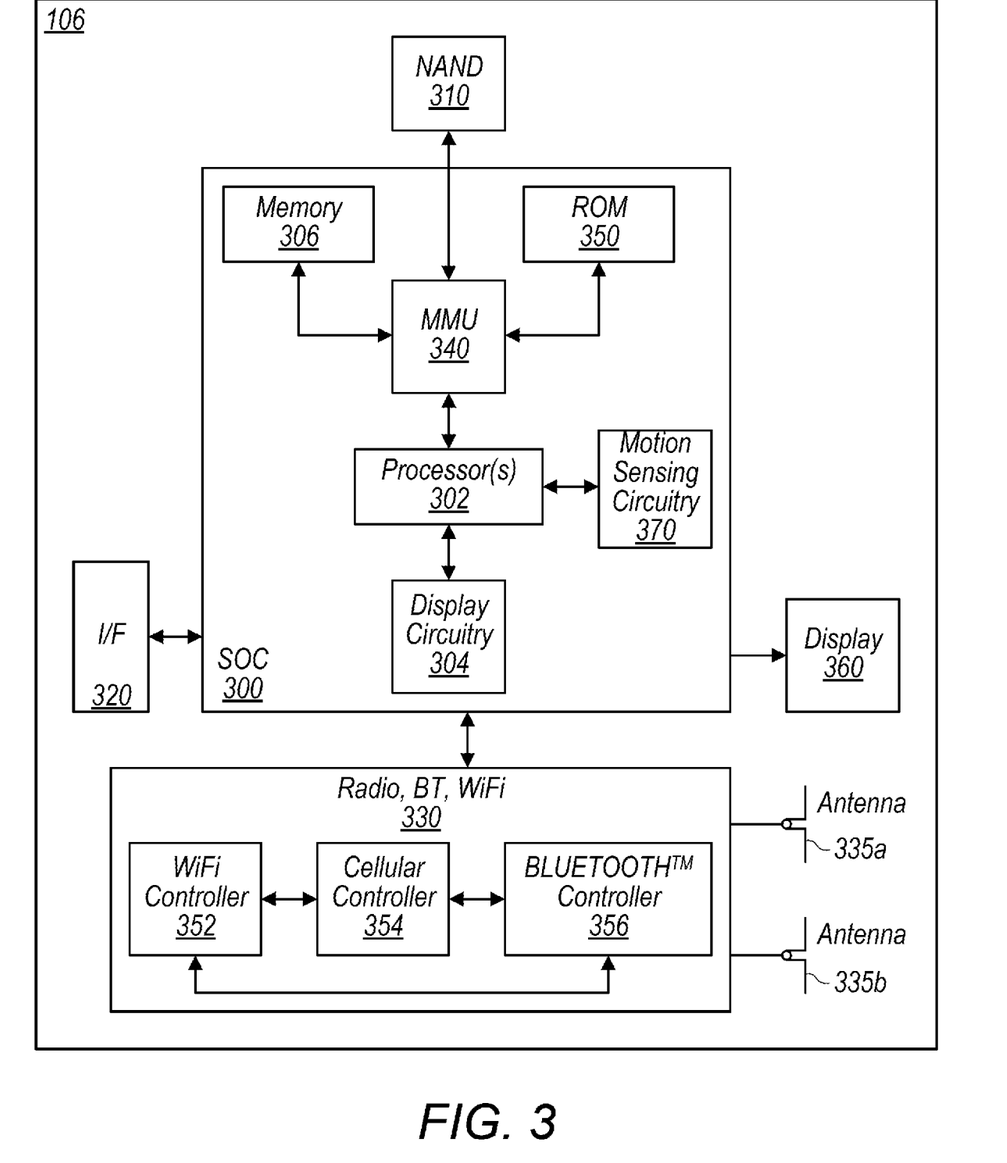
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b (and/or further additional antennas), for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies (e.g., LTE, 5G NR, GSM, etc.).

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
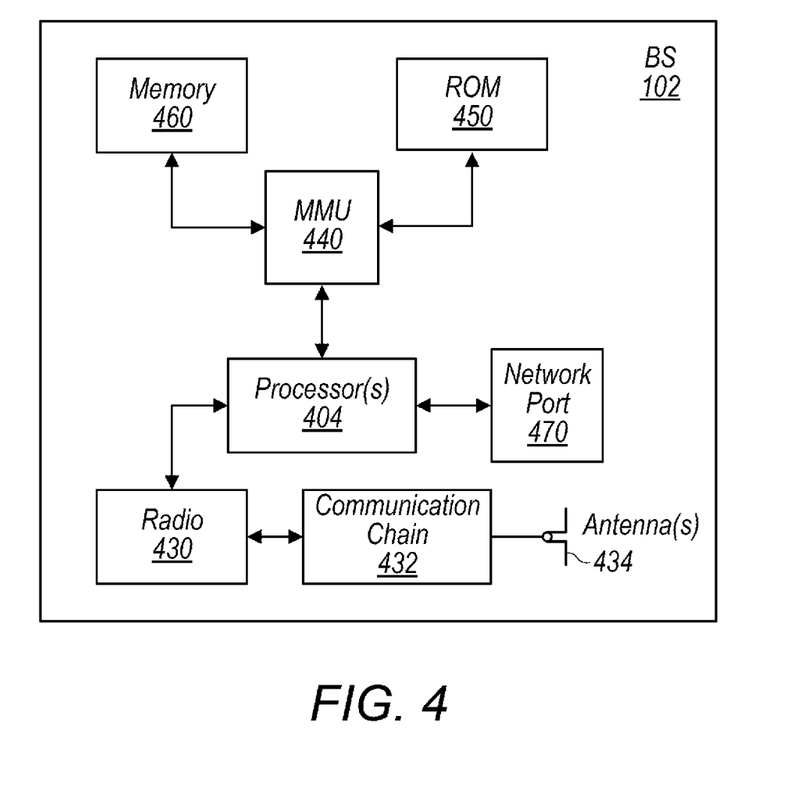
FIG. 4 illustrates an exemplary block diagram of a BS, according to some embodiments.

FIG. 4—Block Diagram of a Base Station (BS)

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430 (or multiple radios 430). The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, LTE and 5G NR, UMTS and GSM, etc.). The BS 102 may provide one or more cells of one or more communication technologies and/or one or more public land mobile networks (PLMNs). The BS 102 may provide multiple cells which may be organized, grouped, or configured as one or more cell sets, according to some embodiments. One or more cell sets that are provided by BS 102 may also include cells provided by one or more additional base stations, according to some embodiments.

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein. The BS 102 may be configured to perform carrier aggregation (CA).

The BS 102 may be an eNodeB (eNB) or gNodeB (gNB), according to various embodiments.

Figure 5A:
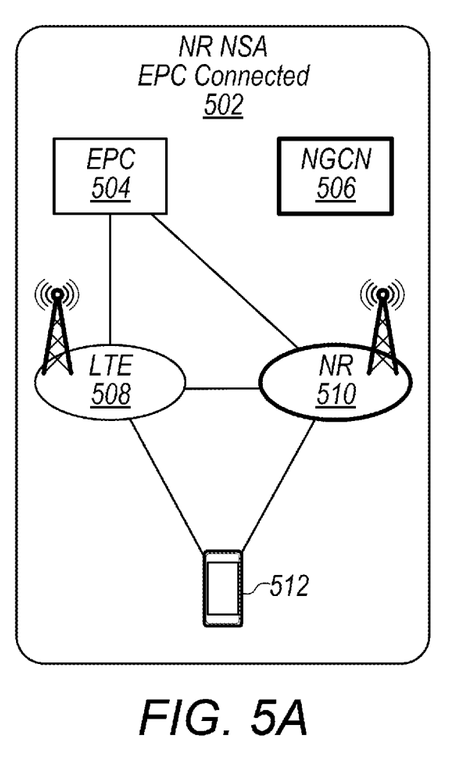
FIGS. 5A-B are schematic diagrams of a non-standalone (NSA) and a standalone (SA) communication configuration, according to some embodiments.
Figure 5B:
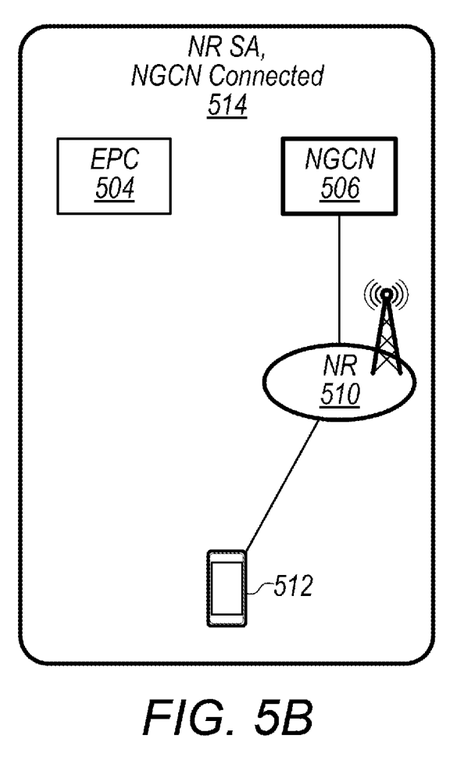

FIGS. 5A-B—ENDC and Standalone Deployments

In some embodiments, a UE device may operate in an area with an Evolved Universal Terrestrial Radio Access (EUTRA) New Radio (NR) Dual Connectivity (ENDC) deployment, where the UE is connected to both a NR gNB in a non-standalone (NSA) deployment and an LTE eNB, and wherein both the gNB and the eNB are connected to an evolved packet core (EPC), as illustrated in FIG. 5A. Alternatively, the UE device may operate in an area with NR standalone (SA) deployment as illustrated in FIG. 5B, where the UE is connected to a next generation converged network (NGCN) via the gNB. The UE may alternatively be connected to an EPC through an eNB using an LTE connection. Embodiments herein describe various methods and devices to provide measurement reports and perform cell selection in these and other environments.

Carrier Aggregation

5G New Radio (NR) and LTE, as well as other wireless networks, may include carrier aggregation (CA), enabling a user equipment device (UE) such as the UE 106 to communicate with multiple cells on separate bandwidths to increase overall throughput. CA techniques may allow for increased throughput or performance by efficiently using the spectrum/frequency resources available to a network.

In general, a UE may establish a connection with the network through a primary cell (PCell), and may subsequently establish a secondary connection with one or more secondary cells (SCells) to increase throughput. The PCell and the one or more SCells may be collocated, or they may be instantiated as separate base stations, according to various embodiments. The PCell and the one or more SCells may operate according to the same RAT (e.g., 5G NR) or different RATs (e.g., LTE and 5G NR), according to various embodiments. In exemplary embodiments, the PCell is an LTE cell (such as an eNB) called the Master Cell Group (MCG) which acts as an anchor cell and on which initial signaling is established, while the SCell is a 5G NR cell (such as a gNB) called the Secondary Cell Group (SCG). The 5G SCell may be added subsequent to the UE attaching to the PCell, either blindly or based on the UE's 5G cell measurements. Data may be then transferred depending on the configuration over the 5G cell. This configuration may be referred to as a Non-Standalone (NSA) configuration with an LTE anchor, and is illustrated schematically in FIG. 5A.

Different UEs may have different capabilities with regard to CA. For example, some UEs may be able to perform CA with certain combinations of frequency ranges, but not with other combinations of frequency ranges. Similarly, different cells, different regions, or different networks may use various combinations of frequency ranges for CA. For example, a given PLMN may have licenses to use different frequency ranges in one region than another. Each of the PCell and the one or more SCells may communicate with the UE using one or more respective frequency bands. One or more of these frequency bands may be measured by the UE, and a corresponding measurement report may be provided by the UE to the base station, in some embodiments.

5G New Radio (5G NR) is designed to support diverse use cases requiring Ultra Reliable Low Latency (URLLC—round trip latency tolerance of 1 ms), Enhanced Mobile Broadband (eMBB—downlink throughputs of around 20 Gbps), and Massive internet-of-things (MIOT—supporting thousands of devices in a cell), among other possibilities.

In some implementations, a sub-6 Ghz frequency range (Sub6) (i.e., a frequency range below 6 GHz) as well as a mmWave frequency range (mmW) may be deployed by one or more gNBs. For the mmW deployment, the bandwidth may be much larger than for the sub-6 GHz frequency range (e.g., the mmW bandwidth may be 50 MHz, 100 Mhz, 200 Mhz, or 400 Mhz, among other possibilities). The Sub6 range is sometimes referred to as "FR1", while the mmW range is sometimes referred to as "FR2". In some embodiments, a UE may need to utilize special radio frequency (RF) modules in order to be able to scan and/or measure these wider bandwidths, which may consume more power than scanning and/or measurements performed over LTE or over Sub6. Accordingly, battery usage may be increased when 5G mmW is in use. Additionally, for beam management, as more elements in these RF modules are active, power consumption may be higher.

It is expected that field deployments for NR for both Sub6 and mmW frequencies may have overlapping coverage. In these embodiments, it may be desirable for the UE to conserve battery power if it is below a certain threshold of remaining battery life, and intelligently make measurement reporting decisions that may trigger NR cell addition by the network.

For a non-standalone (NSA) ENDC deployment, as thermal heat increases in the device during an active data session, some embodiments herein describe steps that may be taken to control the heat to avoid brown out conditions. In previously implemented radio access technologies (RATs), an active session may only involve one technology such as LTE or WCDMA. In contrast, ENDC deployments may involve simultaneous use of both LTE and 5G modems of a UE that are active for a single data session. Accordingly, it may be desirable to evaluate the data on each technology and make intelligent decisions to identify where and when modem power may be backed off to mitigate heating without adversely affecting the data session or the user experience.

Band Measurement Reporting

In a cellular deployment with multiple NR bands (e.g., FR1 and FR2 bands), different bandwidth configurations and carrier components may be available to a UE. In current implementations, the network (NW) may configure and provide a measurement object to a UE indicating a plurality of bands for which the UE is to perform measurements and provide a measurement report. The band measurements may be one of a variety of types of measurements, including but not limited to signal quality measurements, (e.g., signal-to-interference-plus-noise ratio (SINR), received signal strength indicator (RSSI), received signal received quality (RSRQ), or reference signal received power (RSRP) measurements), inter- and/or intra-band measurements, and/or beam measurements, among other possibilities. The UE may perform the indicated band measurements, provide a measurement report for the indicated bands, and the NW may configure a connection with the UE on a first-come, first-serve basis based on the measurement report.

The NW may send a radio resource control (RRC) reconfiguration message adding one of the first NR bands reported by the UE, without providing the UE a choice to camp on a specific requested NR band. These implementations may result in lower throughput and a poor user experience. For example, when the NW configures a measurement ID for both FR1 and FR2 bands and the UE sends a measurement report for FR1, the NW may configure an FR1 band. This may result in lower throughput as FR2 has multiple carrier components of higher bandwidths. In a region where only FR1 bands are available with multiple bands/bandwidths, when a UE sends a measurement report for a low bandwidth FR1 cell, the NW may configure the low bandwidth NR band resulting in a poor user experience.

To address these and other concerns, embodiments described herein present methods and devices for a UE to perform intelligent measurement reporting and band selection based on radio frequency (RF) conditions, available NR component carrier aggregation conditions, total NR aggregate bandwidth of different band combinations, and/or a current temperature of the UE. This may assist the UE in saving power by measuring a limited number of NR bands based on specific criteria.

Figure 6A:
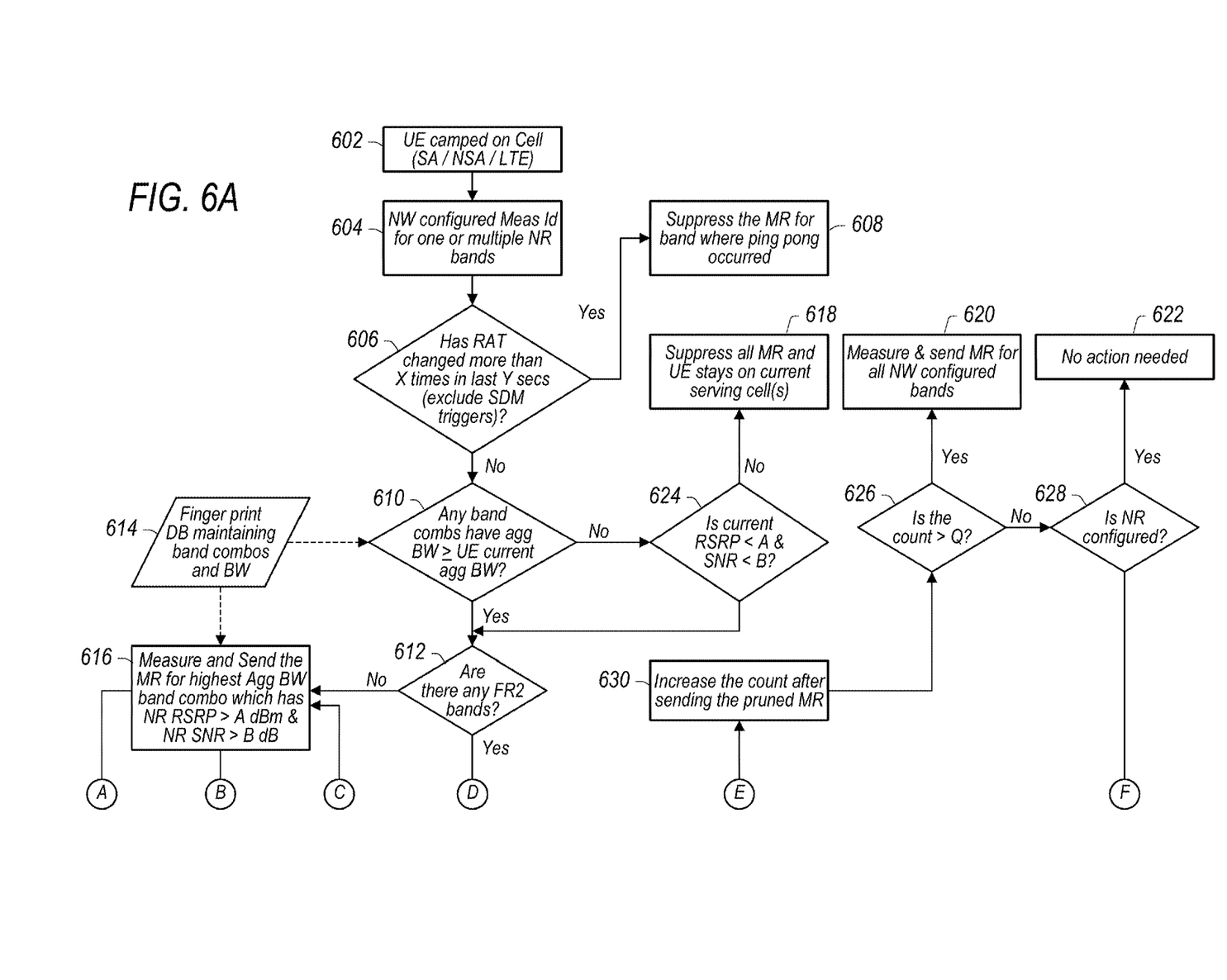
FIGS. 6A-B are a flowchart diagram illustrating methods for a UE to provide pruned measurement reporting, according to some embodiments.
Figure 6B:
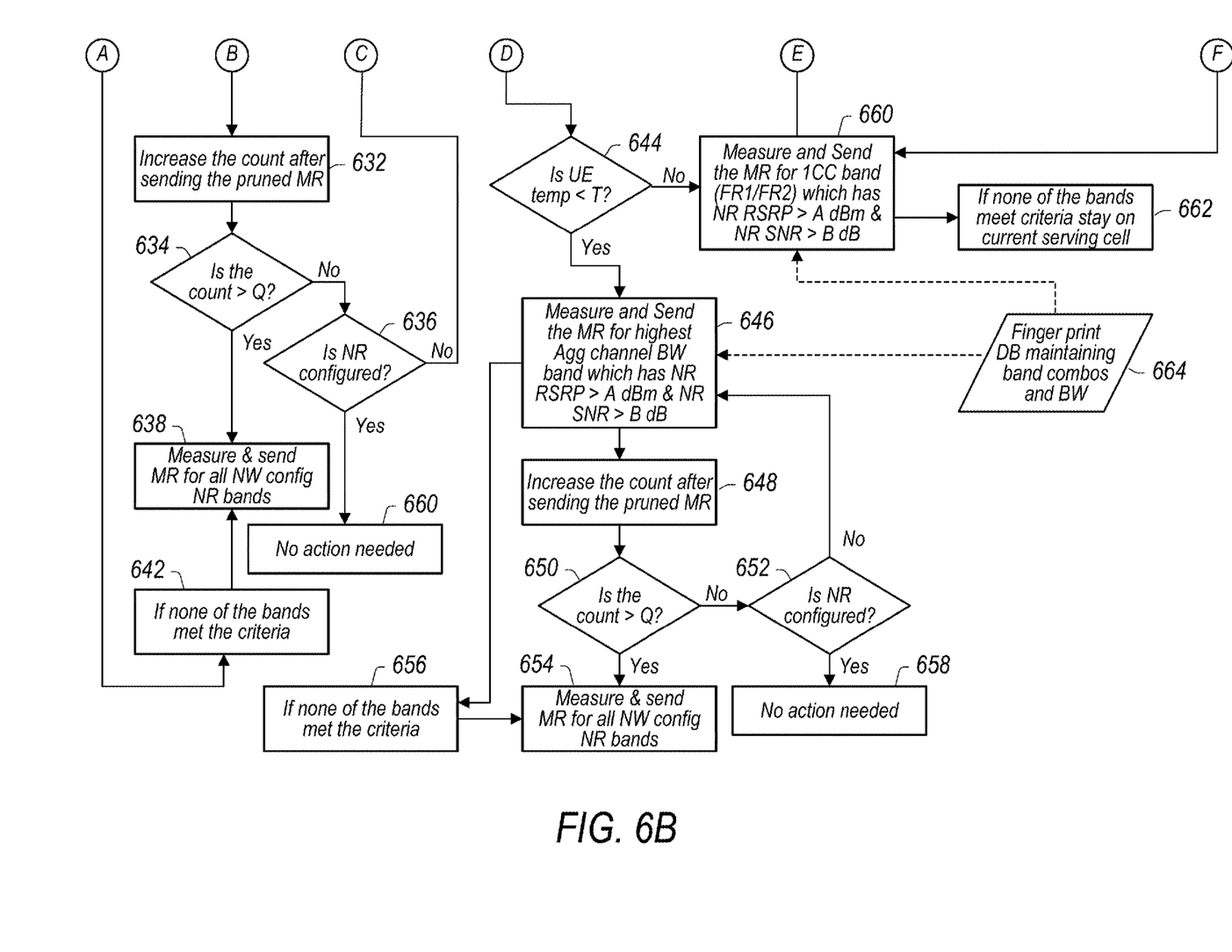

FIGS. 6A-B—Flowchart for Measurement Reporting

FIGS. 6A-B are a flowchart diagram illustrating a method for providing pruned measurement reporting by a UE, according to some embodiments. The circled capital letters A-F at the bottom of FIG. 6A are intended to connected to the corresponding letters at the top of FIG. 6B.

At 602, a UE camps on a cell and established a connection, which may be a standalone (SA), non-standalone (NSA) or LTE connection, among other possibilities. During establishment of the connection, the UE may obtain information about the serving cell, such as a unique cell identifier (ID), a global cell identity (GCI), and/or bandwidth information.

At 604, the network configures a measurement object to provide to the UE, which includes measurement identifiers (IDs) for one or multiple NR bands on which the UE is to perform measurements and measurement reporting. The measurement object may specify specific NR bands and/or band combinations which are available for a connection with the UE. The measurement object is then transmitted to the UE.

At 606, the UE determines whether its connected radio access technology (RAT) has changed (e.g., from LTE to NR or vice versa, from SA to NSA or vice versa, etc.) more than a predetermined number of times (e.g., more than twice) within a predetermined period of time (e.g., within the last 5 seconds, 10 seconds or 15 seconds, etc.). Source-delay-measure (SDM) triggers may be excluded from this determination, i.e., SDM triggers may not qualify as changing RATs for the purposes of this determination.

At 608, responsive to a determination that the connected RAT of the UE has changed more than the predetermined number of times within the predetermined period of time, the UE may suppress measurement reporting to avoid further ping-ponging between RATs. In other words, the UE may refrain from performing any actions responsive to receiving the measurement object from the network at step 604.

At 610, responsive to a determination that the connected RAT of the UE has not changed more than the predetermined number of times within the predetermined period of time, the UE may determine whether any band combinations of bands indicated in the measurement object have an aggregate bandwidth (BW) that is greater than the current aggregate BW of the established connection with the base station (i.e., the connection established at step 602). The band combination may include one or both of LTE and NR bands, and may include a combination of FR1 and/or FR2 bands. The UE may determine which band combinations are available to the UE and/or determine the bandwidths of the bands indicated by the measurement report (MR) based on a fingerprint database stored on a memory of the UE. The fingerprint database may be obtained by the UE from a cloud service, and/or may be opportunistically downloaded by the UE when attached to a wireless local area network, in some embodiments. The fingerprint database may be specific to a particular serving area, such that the fingerprint database includes band combination and bandwidth information related to active bands in a particular cell. For example, the fingerprint database may be associated with a unique cell ID which was received by the UE while establishing the connection at step 602.

At 624, responsive to a determination that none of the available band combinations have an aggregate bandwidth greater than a current aggregate bandwidth of the connection between the UE and the base station, the UE may determine whether current radio frequency (RF) conditions are better than a threshold. For example, the UE may determine whether its current connection has a received signal to received power (RSRP) ratio that is less than a first threshold, and/or a signal-to-noise ratio (SNR) that is less than a second threshold. If the RSRP and/or the SNR are not less than their respective thresholds, at 618 the UE may suppress all measurement reporting and maintain its current connection on its serving cell or cells.

At 612, responsive to either a determination at 610 that an available band combination has an aggregate BW greater than aggregate BW of the current connection or a determination at 624 that the RSRP and/or SNR of the current connection is less than a threshold, the UE may determine whether there are any available FR2 bands indicated in the measurement object.

At 616, responsive to a determination that there are not any available FR2 bands, the UE may perform band measurements and transmit a pruned measurement report to the base station for the available band combination with the highest aggregate BW that also has an RSRP and/or a SNR greater than respective thresholds. The UE may utilize the fingerprint database to determine which band combination has the highest aggregate BW. The pruned measurement report may include measurements of this band combination, but may omit measurements of one or more other bands indicated in the measurement object received from the NW. If none of the available bands satisfy the criteria of step 616, the method may proceed to steps 642 and 638, as described below.

At 632, a counter may be incremented after sending the pruned measurement report. At 634, it is determined whether the counter exceeds a predetermined threshold value. Responsive to determining that counter does not exceed the threshold value, the UE may determine at 636 whether an NR connection has been established with the band combination indicated in the measurement report. If the connection has been established, the method may terminate at step 660. If a connection has not been established, the UE may remeasure and resend the measurement report at step 616.

At 638, responsive to determining that the counter exceeds the threshold, the UE may measure all bands indicated by the measurement object and send a full (i.e., unpruned) measurement report to the base station for all bands indicated in the measurement object. The network may then proceed to establish a connection with the UE based on the received full measurement report.

Returning to step 612, if it is determined that there available FR2 bands indicated in the measurement object, the UE may proceed to determine at 644 whether a temperature of the UE (e.g., a skin temperature, a modem temperature, etc.) is less than a threshold value.

At 646, based on a determination that the temperature of the UE is less than the threshold, the UE may perform band measurements and send a pruned measurement report for an available band combination including one or more FR2 bands that has a highest aggregate bandwidth of all available band combinations, and further that has an RSRP and/or SNR that exceed respective thresholds. The UE may determine which band combination to measure and report by utilizing the fingerprint database. At 656, if none of the available bands satisfy the criteria of step 646, the UE may perform measurements on all available bands and send a full measurement report to the network.

At 648, after sending the pruned measurement report, the UE may increase a counter and check at 650 whether the counter exceeds a threshold. If the threshold is not exceeded, the UE checks at 652 whether a connection has been established using the band combination indicated in the pruned measurement report. If the connection has been established, the method terminates at step 658. If the connection has not been established, the UE remeasures and resends the pruned measurement report at step 646.

At 660, responsive to a determination that the UE temperature is not less than (i.e., is greater than) the threshold, the UE performs band measurements and sends a pruned measurement report for only a single component carrier of an FR1 or FR2 band that satisfies the signal strength criteria (i.e., has an RSRP and/or SNR greater than respective thresholds). The UE may determine which component carrier to use based on the fingerprint database (e.g., to select the component carrier with the highest BW). If no bands are available to satisfy the criteria of step 660, the UE may stay on its current serving cell and refrain from performing band measurements and reporting.

At 630, a counter may be incremented after sending the pruned measurement report. At 626, it is determined whether the counter exceeds a predetermined threshold value. Responsive to determining that counter does not exceed the threshold value, the UE may determine at 628 whether an NR connection has been established with the band combination indicated in the measurement report. If the connection has been established, the method may terminate at step 622. If a connection has not been established, the UE may remeasure and resend the measurement report at step 660.

At 626, responsive to determining that the counter exceeds the threshold, the UE may measure all bands indicated by the measurement object and send a full (i.e., unpruned) measurement report to the base station at step 620 for all bands indicated in the measurement object. The network may then proceed to establish a connection with the UE based on the received full measurement report.

Figure 7:
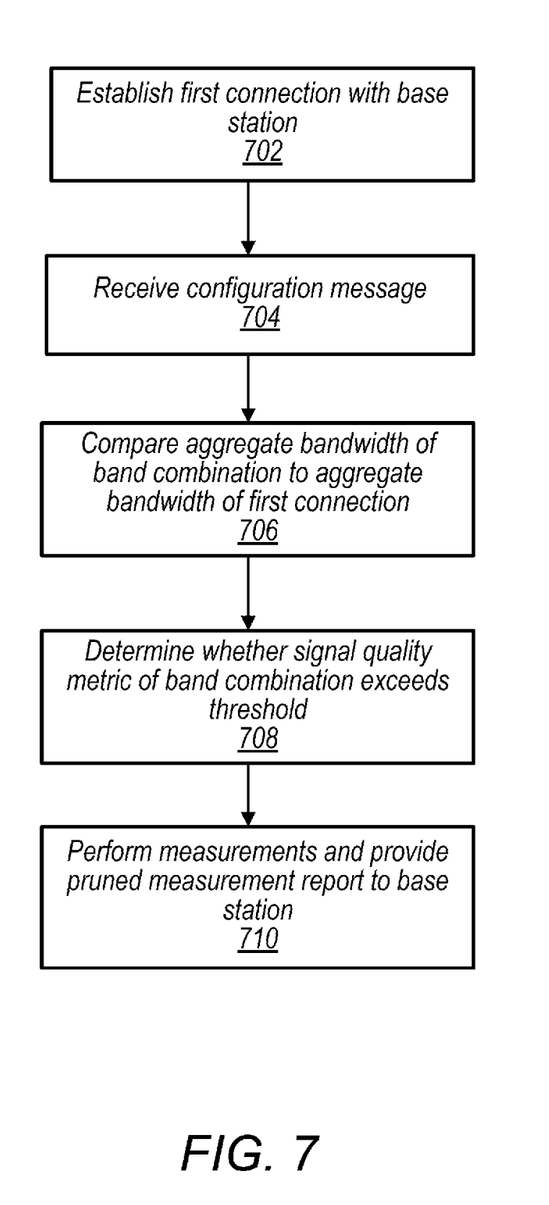
FIG. 7 is a flowchart diagram illustrating further methods for a UE to provide measurement reporting, according to some embodiments.

FIG. 7—Flowchart for Pruned Measurement Reporting

FIG. 7 is a flowchart diagram illustrating a method for performing selective band measurements and measurement reporting, according to some embodiments. Aspects of the method of FIG. 7 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry (e.g., 330), etc., among various possibilities) may cause the UE to perform some or all of the illustrated method elements. Similarly, processor(s) 404, baseband processor(s), processor(s) associated with communication circuitry (e.g., 430, 432), etc., among various possibilities) may cause the BS to perform some or all of the illustrated method elements.

The method steps described in reference to FIG. 7 may contain similarities in part to some of the method steps described in reference to the flowchart illustrated in FIGS. 6A-B. It is considered within the scope of the present disclosure that any part of the description of FIGS. 6A-B may be used in conjunction with the methods described in reference to FIG. 7, as appropriate.

In various embodiments, some of the elements of the method shown may be performed concurrently, in a different order than shown, may be substituted for by other method elements, or may be omitted. Additional method elements may also be performed as desired. As shown, the method may operate as follows.

At 702, a first connection is established with a base station. The connection may be an LTE connection with an eNB, a standalone (SA) connection with a gNB, or a non-standalone (NSA) connection with both an eNB and a gNB. For a NSA connection, the "base station" may refer to either of the eNB or the gNB, in various embodiments.

At 704, a configuration message is received from the base station. The configuration message includes a respective band identifier (ID) for each of a plurality of bands for which the UE is to provide measurement reporting. The configuration message may include a measurement object that specifies the band IDs for each of the plurality of bands.

At 706, the UE determines whether a band combination of the plurality of bands has a first aggregate bandwidth that is greater than a second aggregate bandwidth of the first connection. The band combination may include a single band or multiple bands. For example, the band combination may be an Evolved-Universal Terrestrial Radio Access-New Radio (E-UTRA NR) Dual Connectivity (ENDC) connection, or it may be another type of band combination for a connection that utilizes carrier aggregation and multiple bands. In some embodiments, the UE determines whether the band combination has an aggregate bandwidth greater than the aggregate bandwidth of the first connection by utilizing a fingerprint database stored on the memory medium. The fingerprint database may include band combination and bandwidth information for the plurality of bands. The band combination may specify a plurality of different combinations of bands that are available for the UE to establish a connection, whereas the bandwidth information may specify a bandwidth for each of the plurality of bands. The fingerprint database may contain a cell ID that corresponds to a cell ID associated with the first connection. The UE may flag each band combination with an aggregate bandwidth greater than the aggregate bandwidth of the first connection, and may subsequently determine a signal quality metric for one or more of these band combinations below in step 708.

At 708, it is determined whether a signal quality metric of the determined band combination is greater than a predetermined threshold. In various embodiments, the signal quality metric includes a received signal to received power (RSRP) ratio and/or a signal-to-noise ratio (SNR), and each of the RSRP ratio and the SNR may have their own respective quality thresholds. The UE may first determine whether the band combination with the largest aggregate BW has a signal quality metric that exceeds the quality threshold(s). When the band combination includes multiple bands, the UE may check that each of the multiple bands satisfies the signal quality metric. If the signal quality metric of this band combination exceeds the quality threshold(s), this band combination may be selected for measurement reporting, as described below at step 710. Alternatively, if this band combination does not have a sufficiently high signal quality, the UE may proceed to the band combination with the second highest aggregate BW (from among the band combinations with aggregate bandwidths greater than that of the current connection) to determine whether this band combination satisfies the signal quality threshold, and so on.

At 710, when it is determined that a band combination has an aggregate bandwidth greater than that of the current connection and it is further determined that the signal quality metric of the band combination is greater than the signal quality threshold(s), the UE performs band measurements on the bands of the band combination and transmits a pruned measurement report to the base station. The pruned measurement report includes a measurement report on the bands of the band combination. In some embodiments, even when it is not determined that there is an available band combination with an aggregate bandwidth greater than the current aggregate bandwidth, if it is further determined that the current connection does not satisfy the signal quality metric (i.e., if the signal quality of the first connection is below a threshold), the UE may perform band measurements and provide a pruned measurement report for the available band combination with the highest aggregate bandwidth and/or a sufficiently high signal quality (i.e., that exceeds the signal quality threshold(s)). If it is determined that no available band combinations contain both a sufficiently high aggregate bandwidth and a sufficiently high signal quality, the UE may proceed to perform band measurements on all bands indicated in the configuration message and transmit the full measurement report for each of the plurality of bands to the base station.

In some embodiments, it is determined that a second connection using the band combination associated with the pruned measurement report is not established after transmitting the pruned measurement report to the base station. In these cases, the UE may retransmit the pruned measurement report to the base station a predetermined number of times. If a second connection using this band combination is not established after retransmitting the pruned measurement report to the base station the predetermined number of times, the UE may transmit a full measurement report to the base station, where the full measurement report comprises measurement reports for each of the plurality of bands identified in the configuration message received from the base station. In other words, if a connection is not established for the band combination that is measured and reported on in the pruned measurement report after a predetermined number of attempts, the UE may provide the full measurement report of all bands indicated by the measurement object to assist in establishing a connection.

In some embodiments, it may be determined that the UE has changed between connections more than a threshold number of times within a predetermined period of time. In these cases, the UE may refrain from providing the pruned measurement report to the base station to avoid excess ping-ponging between connections. For example, if the UE has changed between connections (e.g., between a SA and an NSA connection) twice within the previous 10 seconds (or more generally, if it has changed between connections X or more times within the previous Y seconds) when the configuration message is received, the UE may refrain from performing any band measurements and transmitting a measurement report responsive to receiving the configuration message from the base station.

In some embodiments, it is determined that the band combination includes an FR2 band. Responsive to determining that the band combination includes the FR2 band, the UE may determine whether a temperature of the UE exceeds a temperature threshold. When the temperature does exceed the temperature threshold, the UE may transmit a pruned measurement report that includes a measurement report of only one component carrier of the band combination. Alternatively, when the temperature does not exceed the temperature threshold, the pruned measurement report may include measurements of all component carriers of the band combination.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a network device (e.g., a BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The network device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a radio comprising a first antenna and a second antenna;
a non-transitory computer-readable memory medium; and
a processor operably coupled to the radio and the memory medium, wherein the UE is configured to:
establish a first connection with at least one base station;
receive a configuration message from the at least one base station, wherein the configuration message comprises a respective band identifier (ID) for each of a plurality of bands for which the UE is to provide measurement reporting;
determine whether a first aggregate bandwidth of a band combination of the plurality of bands is greater than a second aggregate bandwidth of the first connection;
determine whether a signal quality metric of the band combination is greater than one or more predetermined thresholds;
based at least in part on a determination that the first aggregate bandwidth is greater than the second aggregate bandwidth and a determination that the signal quality metric of the band combination is greater than the one or more predetermined thresholds, perform one or more band measurements on the band combination and transmit a pruned measurement report to the at least one base station, wherein the pruned measurement report comprises results of the one or more band measurements on the band combination.

2. The UE of claim 1, wherein the UE is further configured to:
based at least in part on a determination that the first aggregate bandwidth is not greater than the second aggregate bandwidth or a determination that the signal quality metric of the band combination is not greater than the one or more predetermined thresholds, perform band measurements on each of the plurality of bands and transmit a full measurement report to the at least one base station, wherein the full measurement report comprises results of the band measurements on each of the plurality of bands.

3. The UE of claim 1, wherein the UE is further configured to:
responsive to determining that a second connection using the band combination is not established after transmitting the pruned measurement report to the at least one base station, retransmit the pruned measurement report to the at least one base station a predetermined number of times.

4. The UE of claim 3, wherein the UE is further configured to:
responsive to determining that the second connection using the band combination is not established after retransmitting the pruned measurement report to the at least one base station the predetermined number of times, transmit a full measurement report to the at least one base station, wherein the full measurement report comprises measurement reports for each of the plurality of bands.

5. The UE of claim 1, wherein the UE is further configured to:
determine that the UE has changed between connections more than a threshold number of times within a predetermined period of time;
responsive to determining that the UE has changed between connections more than the threshold number of times within the predetermined period of time, refrain from providing the pruned measurement report to the at least one base station.

6. The UE of claim 1, wherein the UE is further configured to:
determine that the band combination includes an FR2 band; and
responsive to determining that the band combination includes the FR2 band, determine whether a temperature of the UE exceeds a temperature threshold;
wherein the pruned measurement report consists of a measurement report of one component carrier of the band combination responsive to a determination that the temperature of the UE exceeds the temperature threshold, and
wherein the pruned measurement report consists of a measurement report of all component carriers of the band combination responsive to a determination that the temperature of the UE does not exceed the temperature threshold.

7. The UE of claim 1,
wherein determining whether the first aggregate bandwidth is greater than the second aggregate bandwidth of the first connection is performed by utilizing a fingerprint database stored on the memory medium, wherein the fingerprint database comprises band combination and bandwidth information for the plurality of bands.

8. The UE of claim 1,
wherein the signal quality metric comprises one or both of:
a received signal to received power (RSRP) ratio; and
a signal-to-noise ratio (SNR).

9. The UE of claim 1, wherein the UE is further configured to:
responsive to a determination that first aggregate bandwidth is not greater than the second aggregate bandwidth, determine that a signal quality metric of the first connection is less than the one or more predetermined thresholds; and
based at least in part on a determination that the first aggregate bandwidth is not greater than the second aggregate bandwidth and a determination that the signal quality metric of the first connection is less than the one or more predetermined thresholds, perform one or more band measurements on the band combination and transmit a pruned measurement report to the at least one base station, wherein the pruned measurement report comprises results of the one or more band measurements on the band combination.

10. The UE of claim 1,
wherein the at least one base station comprises one or both of an eNodeB (eNB) and a gNodeB (gNB), and
wherein the first connection comprises one of:
an Evolved Universal Terrestrial Radio Access (EUTRA) New Radio (NR) Dual Connectivity (ENDC) non-standalone (NSA) connection;
a $5^{th}$ Generation New Radio (5G NR) standalone (SA) connection; or
an LTE connection.

11. A baseband processor configured to cause a user equipment device (UE) to: establish a first connection with at least one base station;
receive a configuration message from the at least one base station, wherein the configuration message comprises a respective band identifier (ID) for each of a plurality of bands for which the UE is to provide measurement reporting;
determine whether a first aggregate bandwidth of a band combination of the plurality of bands is greater than a second aggregate bandwidth of the first connection;
determine whether a signal quality metric of the band combination is greater than one or more predetermined thresholds;
based at least in part on a determination that the first aggregate bandwidth is greater than the second aggregate bandwidth and a determination that the signal quality metric of the band combination is greater than the one or more predetermined thresholds, perform one or more band measurements on the band combination and transmit a pruned measurement report to the at least one base station, wherein the pruned measurement report comprises results of the one or more band measurements on the band combination.

12. The baseband processor of claim 11, wherein baseband processor is further configured to cause the UE:
responsive to determining that a second connection using the band combination is not established after transmitting the pruned measurement report to the at least one base station, retransmit the pruned measurement report to the at least one base station a predetermined number of times.

13. The UE of claim 12, wherein baseband processor is further configured to cause the UE:
responsive to determining that the second connection using the band combination is not established after retransmitting the pruned measurement report to the at least one base station the predetermined number of times, transmit a full measurement report to the at least one base station, wherein the full measurement report comprises measurement reports for each of the plurality of bands.

14. The baseband processor of claim 11, wherein baseband processor is further configured to cause the UE:
determine that the UE has changed between connections more than a threshold number of times within a predetermined period of time;
responsive to determining that the UE has changed between connections more than the threshold number of times within the predetermined period of time, refrain from providing the pruned measurement report to the at least one base station.

15. The baseband processor of claim 11, wherein baseband processor is further configured to cause the UE:

determine that the band combination includes an FR2 band; and responsive to determining that the band combination includes the FR2 band, determine whether a temperature of the UE exceeds a temperature threshold;

wherein the pruned measurement report consists of a measurement report of one component carrier of the band combination responsive to a determination that the temperature of the UE exceeds the temperature threshold, and wherein the pruned measurement report consists of a measurement report of all component carriers of the band combination responsive to a determination that the temperature of the UE does not exceed the temperature threshold.

16. The baseband processor of claim 11, wherein determining whether the first aggregate bandwidth is greater than the second aggregate bandwidth of the first connection is performed by utilizing a fingerprint database stored on a memory medium, wherein the fingerprint database comprises band combination and bandwidth information for the plurality of bands.

17. The baseband processor of claim 11, wherein the signal quality metric comprises one or both of:
- a received signal to received power (RSRP) ratio; and
- a signal-to-noise ratio (SNR).

18. The baseband processor of claim 11, wherein baseband processor is further configured to cause the UE:

responsive to a determination that first aggregate bandwidth is not greater than the second aggregate bandwidth, determine that a signal quality metric of the first connection is less than the one or more predetermined thresholds; and based at least in part on a determination that the first aggregate bandwidth is not greater than the second aggregate bandwidth and a determination that the signal quality metric of the first connection is less than the one or more predetermined thresholds, perform one or more band measurements on the band combination and transmit a pruned measurement report to the at least one base station, wherein the pruned measurement report comprises results of the one or more band measurements on the band combination.

19. The baseband processor of claim 11, wherein the at least one base station comprises one or both of an eNodeB (eNB) and a gNodeB (gNB), and wherein the first connection comprises one of:
- an Evolved Universal Terrestrial Radio Access (EUTRA) New Radio (NR) Dual Connectivity (ENDC) non-standalone (NSA) connection;
- a $5^{th}$ Generation New Radio (5G NR) standalone (SA) connection; or
- an LTE connection.

20. A method for operating a user equipment device (UE), the method comprising:

establishing a first connection with at least one base station;

receiving a configuration message from the at least one base station, wherein the configuration message comprises a respective band identifier (ID) for each of a plurality of bands for which the UE is to provide measurement reporting;

determining that a first aggregate bandwidth of a band combination of the plurality of bands is greater than a second aggregate bandwidth of the first connection;

determining that a signal quality metric of the band combination is greater than one or more predetermined thresholds;

based at least in part on the determination that the first aggregate bandwidth is greater than the second aggregate bandwidth and the determination that the signal quality metric of the band combination is greater than the one or more predetermined thresholds, performing one or more band measurements on the band combination and transmitting a pruned measurement report to the at least one base station, wherein the pruned measurement report comprises results of the one or more band measurements on the band combination.

* * * * *

UNITED STATES PATENT AND TRADEMARK OFFICE
CERTIFICATE OF CORRECTION

PATENT NO. : 11,516,810 B1
APPLICATION NO. : 17/331163
DATED : November 29, 2022
INVENTOR(S) : Sofheem Mohammed et al.

It is certified that error appears in the above-identified patent and that said Letters Patent is hereby corrected as shown below:

In the Claims

Column 20, Line 46, delete "UE" and insert --baseband processor--.

Signed and Sealed this
Twenty-third Day of May, 2023

Katherine Kelly Vidal
*Director of the United States Patent and Trademark Office*